United States Patent
Shah et al.

(10) Patent No.: US 11,615,542 B2
(45) Date of Patent: Mar. 28, 2023

(54) AUTOMATIC PERSPECTIVE CORRECTION FOR IN-FLIGHT ENTERTAINMENT (IFE) MONITORS

(71) Applicant: Panasonic Avionics Corporation, Lake Forest, CA (US)

(72) Inventors: Shrenik Shah, San Juan Capistrano, CA (US); Feng Jiang, Irvine, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 642 days.

(21) Appl. No.: 16/684,540

(22) Filed: Nov. 14, 2019

(65) Prior Publication Data

US 2021/0150740 A1  May 20, 2021

(51) Int. Cl.
*G06T 7/536* (2017.01)
*B64D 11/00* (2006.01)
*G06F 17/13* (2006.01)
*G02B 27/00* (2006.01)
*F16M 11/12* (2006.01)

(52) U.S. Cl.
CPC ........ *G06T 7/536* (2017.01); *B64D 11/00151* (2014.12); *B64D 11/00153* (2014.12); *F16M 11/125* (2013.01); *G02B 27/0093* (2013.01); *G06F 17/13* (2013.01)

(58) Field of Classification Search
CPC .... G06F 17/13; G09G 5/373; G09G 2320/04; G09G 2340/04; G09G 2356/00; G09G 2380/12; G06T 7/536; G02B 27/0093; G02B 27/0068; B64D 11/00151; B64D 11/00153; F16M 11/125
See application file for complete search history.

(56) References Cited

U.S. PATENT DOCUMENTS

| | | | | |
|---|---|---|---|---|
| 6,813,777 B1 * | 11/2004 | Weinberger | ........... | H04L 67/565 348/E7.071 |
| 6,822,812 B1 * | 11/2004 | Brauer | ...................... | A47C 7/72 359/743 |
| 7,088,310 B2 * | 8/2006 | Sanford | ................ | A61M 21/02 348/148 |
| 7,643,063 B2 * | 1/2010 | Trescott | ............. | H04N 5/23248 348/208.99 |
| 8,429,174 B2 * | 4/2013 | Ramani | .............. | G06V 30/1988 345/473 |

(Continued)

FOREIGN PATENT DOCUMENTS

| | | | | |
|---|---|---|---|---|
| JP | | 5544018 B2 * | 7/2014 | ............. B60N 2/879 |
| JP | | 2019102976 | 6/2019 | |

(Continued)

*Primary Examiner* — Philip P. Dang

(74) *Attorney, Agent, or Firm* — Perkins Coie LLP

(57) ABSTRACT

Disclosed embodiments are directed at devices, methods, and systems for fixing distortions of content displayed on in-flight entertainment (IFE) monitors in a commercial passenger vehicle. An IFE monitor can receive angular measurement data from one or more gyroscope sensors to determine a differential angle of tilt of the IFE monitor. In response to determining that the differential angle of tilt is non-zero, the IFE monitor can detect that content displayed on the IFE monitor is subject to distortion. The IFE monitor can automatically apply a perspective correction to the content displayed on the IFE monitor for fixing the perceived distortion.

18 Claims, 10 Drawing Sheets

(56) References Cited

U.S. PATENT DOCUMENTS

| | | | | |
|---|---|---|---|---|
| 8,706,915 | B2* | 4/2014 | Duchesneau | G06F 9/5072 |
| | | | | 709/250 |
| 9,037,354 | B2* | 5/2015 | Mondragon | G09G 5/00 |
| | | | | 701/48 |
| 9,084,004 | B2* | 7/2015 | Rawlinson | H04N 21/41422 |
| 9,299,260 | B2* | 3/2016 | Sobue | B60R 1/00 |
| 9,311,115 | B2* | 4/2016 | Schubert | G06F 9/452 |
| 9,459,521 | B2* | 10/2016 | Bauer | B64D 11/00153 |
| 9,499,270 | B2* | 11/2016 | Riedel | B64D 11/0015 |
| 9,864,559 | B2* | 1/2018 | Sizelove | B64D 11/0015 |
| 10,007,853 | B2* | 6/2018 | Takeda | B60R 1/00 |
| 10,009,585 | B2* | 6/2018 | Honkanen | H04N 9/3135 |
| 10,219,059 | B2* | 2/2019 | Dunn | B64D 11/00155 |
| 10,223,835 | B2* | 3/2019 | Cashen | G02B 27/0101 |
| 10,303,414 | B2* | 5/2019 | Watanabe | H04N 9/3155 |
| 10,339,639 | B2* | 7/2019 | Christ | G06T 5/007 |
| 10,452,934 | B1* | 10/2019 | Brauer | B60J 3/007 |
| 10,467,980 | B2* | 11/2019 | Watson | G09G 5/006 |
| 10,506,339 | B2* | 12/2019 | Dunn | H04R 3/04 |
| 10,572,982 | B2* | 2/2020 | Beric | G06T 5/006 |
| 10,657,517 | B2* | 5/2020 | Blackwell | G06Q 20/34 |
| 10,728,587 | B2* | 7/2020 | Braun | H04N 21/41422 |
| 10,853,962 | B2* | 12/2020 | Ueno | G06T 7/73 |
| 11,214,248 | B2* | 1/2022 | Taniguchi | G06T 1/00 |
| 2004/0217976 | A1* | 11/2004 | Sanford | B64D 11/00151 |
| | | | | 345/619 |
| 2006/0017807 | A1* | 1/2006 | Lee | H04N 5/232945 |
| | | | | 348/E7.086 |
| 2008/0049020 | A1* | 2/2008 | Gusler | G06F 3/048 |
| | | | | 345/427 |
| 2009/0288123 | A1* | 11/2009 | Havlovick | B64D 11/0624 |
| | | | | 340/963 |
| 2010/0283637 | A1* | 11/2010 | Franko | B64D 11/0015 |
| | | | | 345/629 |
| 2013/0044124 | A1* | 2/2013 | Reichert, Jr. | H04N 5/272 |
| | | | | 345/618 |
| 2014/0092142 | A1 | 4/2014 | Boelter et al. | |
| 2014/0369527 | A1* | 12/2014 | Baldwin | H03G 7/002 |
| | | | | 381/107 |
| 2017/0289463 | A1* | 10/2017 | Asao | B64D 11/0015 |
| 2018/0048827 | A1* | 2/2018 | Seydoux | B64C 39/024 |
| 2019/0047498 | A1* | 2/2019 | Alcaidinho | B60R 16/037 |
| 2019/0129172 | A1* | 5/2019 | Misawa | G02B 27/0101 |
| 2019/0259171 | A1* | 8/2019 | Ueno | B64D 11/00155 |
| 2021/0409725 | A1* | 12/2021 | Pedzisz | H04N 19/14 |

FOREIGN PATENT DOCUMENTS

| | | | | |
|---|---|---|---|---|
| WO | WO-9937539 A1 * | 7/1999 | | B64D 11/0015 |
| WO | WO-2005079309 A2 * | 9/2005 | | G06F 17/30861 |
| WO | WO-2014052884 A1 * | 4/2014 | | A61B 5/0404 |

* cited by examiner

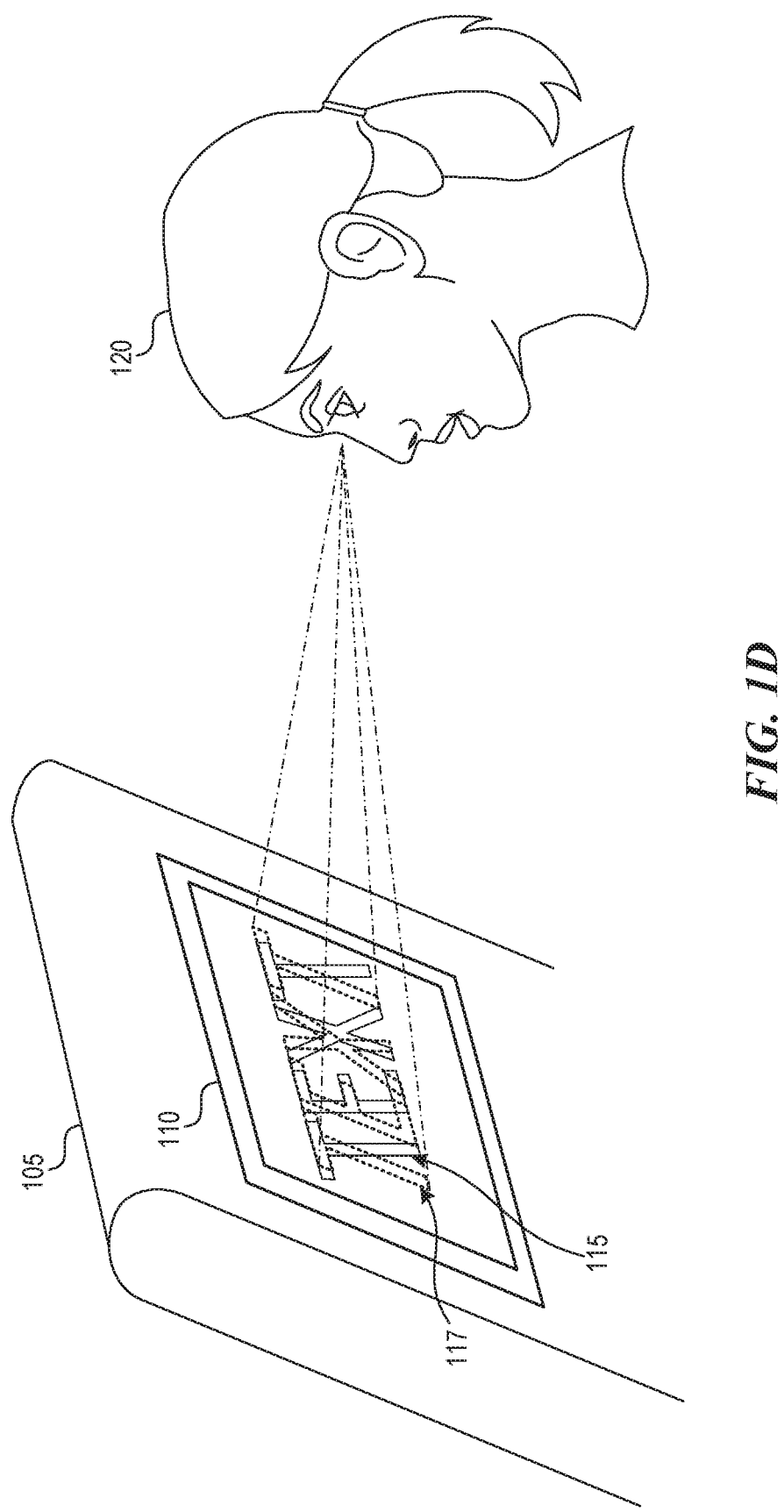

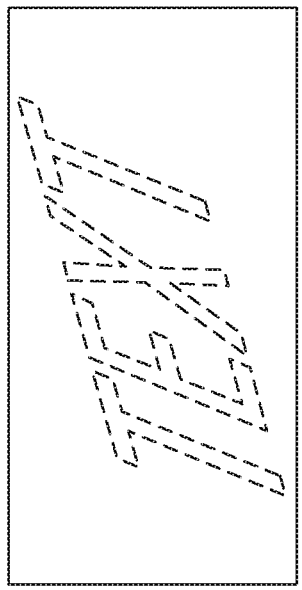
FIG. 2A — Original Content
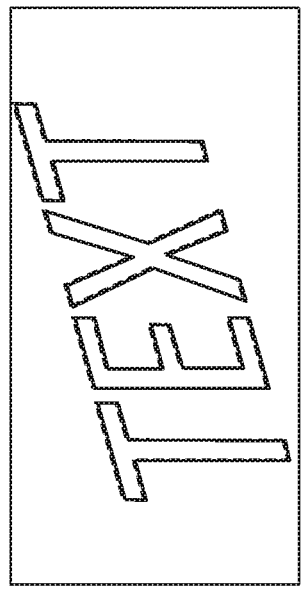
FIG. 2B — Content observed by passenger
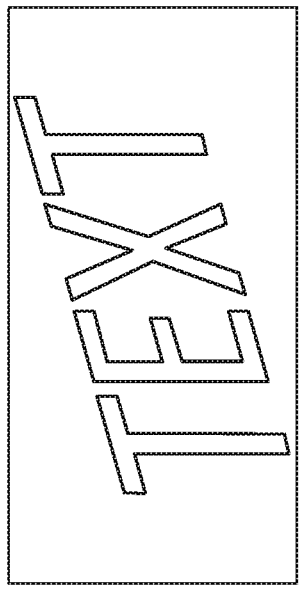
FIG. 2C — Comparison of Content
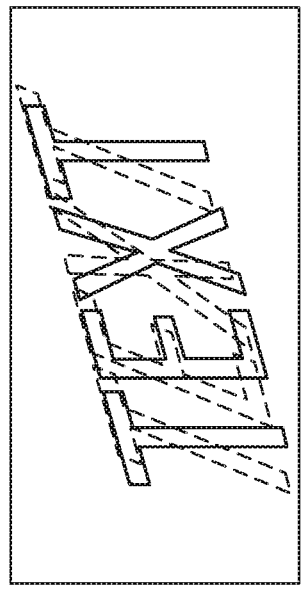
FIG. 2D — Outcome of Perspective correction

AUTOMATIC PERSPECTIVE CORRECTION FOR IN-FLIGHT ENTERTAINMENT (IFE) MONITORS

TECHNICAL FIELD

This document is directed generally to automatic correction of perspective distortion of content presented on IFE monitors in commercial passenger vehicles.

BACKGROUND

Commercial travel has evolved to provide entertainment options to passengers traveling to their destinations. For example, in an airplane or train, entertainment options are provided on monitors located on the back of seats, where the monitors enable passengers to watch movies, television shows, play games, order food and beverages, purchase goods and services online, and/or or listen to music as they travel to their destinations. The monitors allow passengers to pay for their preferred options using the monitors. In many instances, content presented on the in-flight entertainment (IFE) monitors suffer from tilt or perspective distortion.

For example in a convention IFE system, content displayed on IFE monitors in a commercial passenger vehicle such as an airplane may suffer from perspective distortion as a consequence of passengers reclining their seats. This distortion can be perceived or observed by a passenger who views the content on a front-facing IFE monitor attached to the back of a passenger seat. As one example, when a passenger viewing a front-facing IFE monitor reclines his or her seat, the displayed content can be perceived as distorted by the passenger viewing the content on the IFE monitor. In another example, a first passenger sitting on the seat in a row where an IFE monitor is attached can recline his or her seat. Consequently, another passenger one row behind the first passenger, who is viewing the content on the front-facing IFE monitor perceives a distortion.

Conventionally, IFE monitors make use of mechanical structures to fix perspective distortions in displayed content on IFE monitors. For example, by using a tilting mechanism, an IFE monitor allows a passenger to manually move the IFE monitor in an attempt to fix the perspective distortion. However, in many scenarios, the fix is not a permanent fix and passengers have to continually make manual changes to the IFE monitor to adjust the viewing angle. Further, the tilting mechanism used in current IFE monitors relies on use of heavy mechanical structural elements or parts to perform the tilting action, causing extra weight to be added to the commercial passenger vehicle and additional complexity in design. Even further, the temporary adjustments made by a passenger to fix the viewing angle may not fully rectify the distortion and can only provide a partial correction.

Notwithstanding the above drawbacks of conventional IFE monitors, when IFE monitors are physically tilted, they occupy more space, which makes it harder to design a sleek and low-profile passenger seat. Thus, there is a need for an automatic manner of applying perspective correction to content displayed on IFE monitors for providing a positive travel experience to passengers.

SUMMARY

This patent document describes exemplary systems, devices, and methods directed at automatically correcting perspective distortion of content presented on IFE monitors in a commercial passenger vehicle environment. For example, an IFE monitor attached to a back of a passenger seat can be configured to receive angular measurement data from multiple sensors. The received angular measurement data can be used to compute a correction angle for rectifying the perspective distortion of content presented on the IFE monitor.

In one aspect, a method of fixing distortions to content displayed on in-flight entertainment (IFE) monitors in a commercial passenger vehicle is disclosed. The method includes receiving, at an IFE monitor, a first information from a first sensor and a second information from a second sensor; detecting, based on the first information and the second information, an occurrence of a distortion-causing event; in response to detecting the distortion-causing event, computing a perspective correction applicable to the content displayed on the IFE monitor; and automatically applying the perspective correction to the content displayed on the IFE monitor.

In another aspect, a system for fixing perceived distortions to content displayed on in-flight entertainment (IFE) monitors in a commercial passenger vehicle is disclosed. The system includes a first IFE monitor located in the commercial passenger vehicle, the first IFE monitor configured to: receive a first angular measurement data from a first gyroscope sensor and a second angular measurement data from a second gyroscope sensor, wherein the first gyroscope sensor is included in the first IFE monitor; compute, using the first angular measurement data and the second angular measurement data, a differential angle of tilt; in response to determining that the differential angle of tilt is non-zero, detect that a content displayed on the IFE monitor is subject to a perceived distortion; and automatically apply a perspective correction to the content displayed on the IFE monitor for fixing the perceived distortion, wherein the perspective correction is based on the differential angle of tilt; and a second IFE monitor located in the commercial passenger vehicle, the second IFE monitor configured to: receive the second angular measurement data measured by the second gyroscope sensor, wherein the second gyroscope sensor is included in the second IFE monitor; and communicate the second angular measurement data to the first IFE monitor.

In yet another aspect, a non-transitory, computer-readable storage medium storing instructions is disclosed. The computer-readable storage medium when executed by a computing system associated with an in-flight entertainment (IFE) monitor cause the IFE monitor to perform operations for automatic corrections of distortions to content displayed on the IFE monitor, the operations at the IFE monitor comprising: receiving a first angular measurement data from a first gyroscope sensor and a second angular measurement data from a second gyroscope sensor; computing, using the first angular measurement data and the second angular measurement data, a differential angle of tilt associated with the IFE monitor; in response to determining that the differential angle of tilt is non-zero, detecting that a content displayed on the IFE monitor is subject to a perceived distortion; and automatically applying a perspective correction to the content displayed on the IFE monitor for fixing the perceived distortion, wherein the perspective correction is based on the differential angle of tilt, wherein a computation of the perspective correction is without a use of a mechanical structure.

BRIEF DESCRIPTION OF THE DRAWINGS

FIG. 1D illustrates perceived distortions to content displayed on the IFE monitor of FIG. 1B when the IFE monitor is reclined.

FIG. 2A is a conceptual diagram illustrating original content displayed on an IFE monitor.

FIG. 2B is a conceptual diagram illustrating content displayed on the IFE monitor of FIG. 2A as perceived by the human eye.

FIG. 2C is a conceptual diagram illustrating a comparison of the content of FIG. 2A and FIG. 2B FIG. 2D is a conceptual diagram illustrating an outcome of performing perspective correction as perceived by the human eye.

DETAILED DESCRIPTION

Figure 1A:
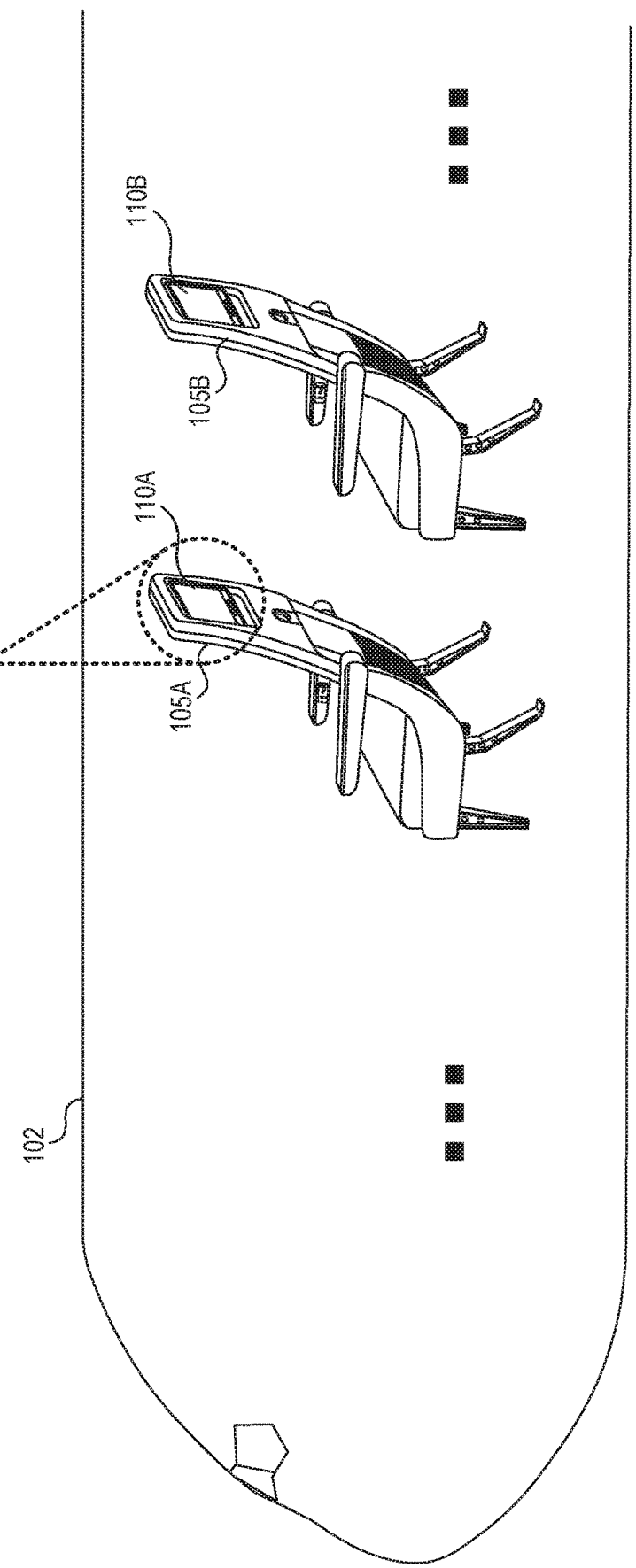
FIG. 1A illustrates an overview of operation of the disclosed perspective correction system.

Some embodiments described in the present document may apply automatic perspective corrections to content displayed on IFE monitors of a commercial passenger vehicle such as an airplane. Some embodiments can fix or rectify perspective distortions to content displayed on an IFE monitor. In some embodiments, the applied perspective correction can be any type of perspective correction, e.g., a horizontal perspective correction, a vertical perspective correction, or a combination of horizontal and vertical perspective corrections. At least one advantage of the presently disclosed methods of fixing the distortion is that the aspect ratio of the originally displayed content may be preserved. For example, if the height of the distorted content appears smaller (or larger), then applying a perspective correction magnifies (or reduces) the height of the content, causing the resulting content to appear distortion-free or almost distortion-free. In another example, if the width of the distorted content appears smaller (larger), then applying a perspective correction magnifies (reduces) the width of the content, causing the resulting content to appear distortion-free or almost distortion-free.

Another advantage of some embodiments may be that the perspective correction applied fixes the distortion without use of a mechanical structure. In some embodiments, the disclosed methods can be implemented by a software application configured to run on an IFE monitor. Yet another advantage of some embodiments is that it allows a passenger to view "more squared content" devoid of distortion, without having to manually tilt or adjust the IFE monitor. In some embodiments, the application of perspective correction to the displayed content can be made in real-time or near real-time with respect to a time when the IFE monitor detects a distortion-causing event. In some embodiments, perspective correction can be implemented at one or more or all seats in an airplane. Thus, passengers on the airplane can view corrected content on their IFE monitors instantaneously or almost instantaneously.

In some embodiments, a distortion-causing event can be detected using angular measurements provided by sensors such as gyroscope sensors. For example, a gyroscope included within an IFE monitor can detect when a seat is reclined. Accordingly, based on an angle of recline, the disclosed perspective correction system can compute a perspective correction applicable to the displayed content.

In some embodiments, an IFE monitor (or, equivalently a software application configured to run on the IFE monitor) can receive multiple sets of angular measurements provided by multiple gyroscope sensors included within multiple passenger seats. For example, a first angular measurement data from a first gyroscope sensor coupled to itself, and a second angular measurement data from a second gyroscope sensor coupled to another IFE monitor. Based on the first angular measurement data (from its gyroscope sensor) and the second angular measurement data (from the gyroscope sensor included in another IFE monitor), the IFE monitor can compute a differential angle of tilt associated with the IFE monitor. In response to the IFE monitor determining that the differential angle of tilt is non-zero, the IFE monitor can detect a distortion-causing event, which can cause content displayed on the IFE monitor to be subjected to a perceived distortion. Accordingly, the IFE monitor computes a perspective correction and automatically applies the perspective correction to the content displayed on the IFE monitor. As a consequence of applying the perspective correction, the distortion to the content as viewed by a passenger is rectified. In the discussions herein, it will be understood that in addition to being attached to the backs of passenger seats, the term "IFE monitor" can apply to a monitor or screen attached to a bulk head region of a commercial passenger vehicle.

The technology described in the present document can be used (in whole or in part) by embodiments of an in-flight entertainment systems: create opportunities for a more interactive and immersive travel experience for passengers and crew members, present corrected content that is perceived as distortion-free or almost distortion-free to the human eye, is a fully automated solution for fixing distortion with zero (or minimal) manual operation, improve scalability of various applications, create new revenue streams for airline companies, and improve innovation in the airplane industry. Advantageously, the embodiments disclosed in this document are applicable for any model or type of an airplane and not limited to certain types of aircraft. Also, advantageously, the disclosed technology is applicable to newer IFE systems and is backwards compatible with legacy and already in-service IFE systems without any physical installation or modification. Further, advantageously, the disclosed technology does not make use of mechanical parts or structures. For example, by applying a software update, older IFE systems can make use of the disclosed technology. Thus, failures arising from mechanical malfunctioning can be eliminated or significantly reduced. Several implementations of the disclosed technology are discussed below in more detail in reference to the figures.

FIG. 1A illustrates an overview of operation of the disclosed perspective correction system in an airplane environment. For example, FIG. 1A shows airplane 102 with passenger seats 105A and 105B. Seats 105A, 105B can be aisle, row, middle or window seats, and located anywhere on the airplane, and associated with any flying class. Seats 105A and 105B include at their respective backs, front-facing IFE monitors 110A and 110B. For example, IFE monitor 110A can display content (such as images and/or video) to a passenger seated on seat 105B. A passenger seated on seat 105A can recline or incline his or her seat. A passenger seated on seat 105B can recline/incline his or her seat. As a result of changing the upright positions of seat 105A and/or seat 105B, the content displayed on IFE monitor 110A can be perceived as distorted from its original version. According to the technology disclosed herein, a perspective correction is applied to the distorted content to rectify or fix the distortion, causing the content to be perceived as identical or nearly identical to the originally displayed content.

Figure 1B:
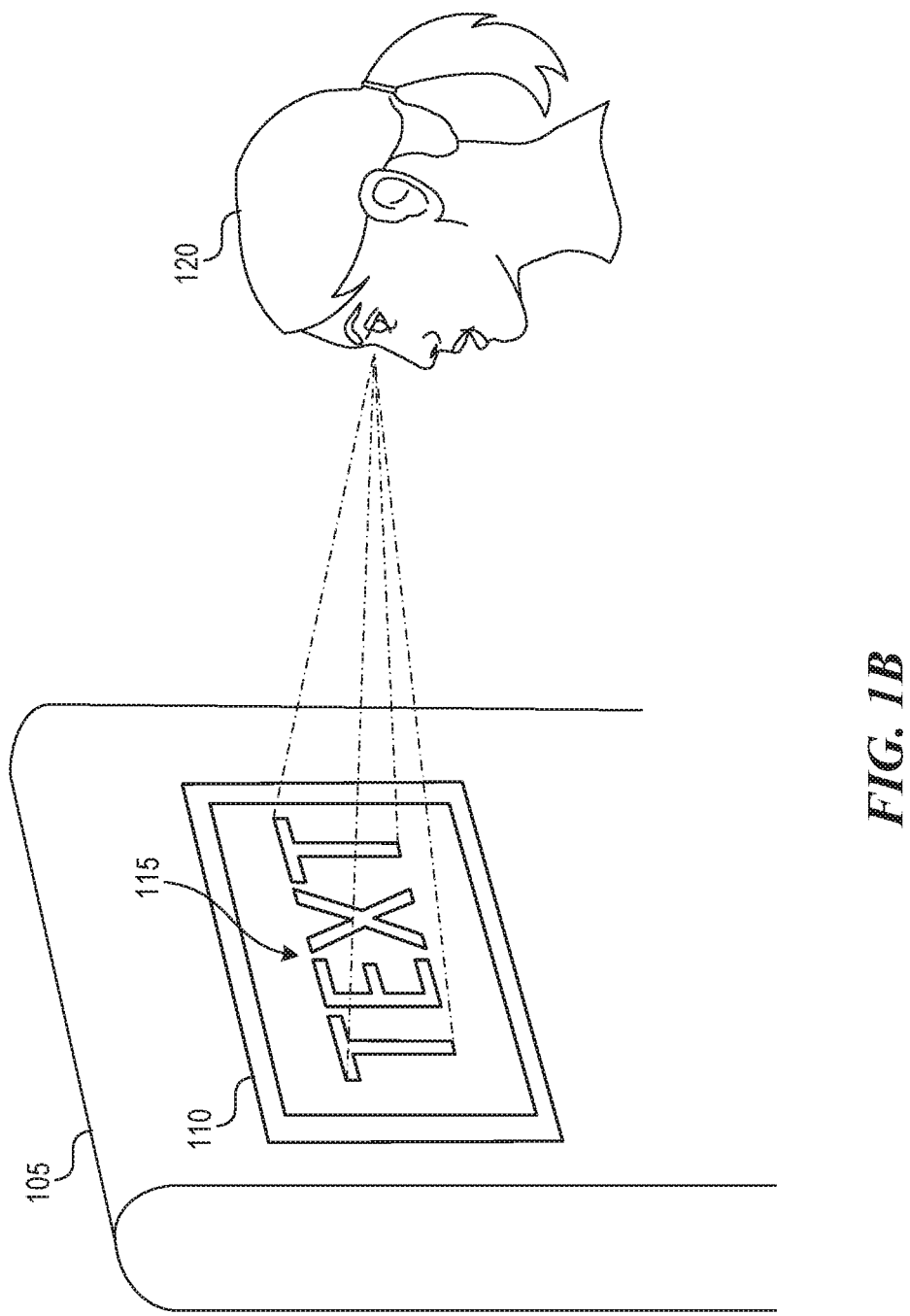
FIG. 1B illustrates a passenger viewing an IFE monitor located in a commercial passenger vehicle.

FIG. 1B illustrates a passenger viewing an IFE monitor located in a commercial passenger vehicle. In FIG. 1B, original content 115 (e.g., the word "TEXT" against a background) is displayed on IFE monitor 110 attached to a back of passenger seat 105. Original content 115 appearing on IFE monitor 110 is the actual content and appears without any perceived distortion to passenger 120, when neither passenger 120 nor another passenger sitting on seat 105 change the upright positions of their respective seats.

Figure 1C:
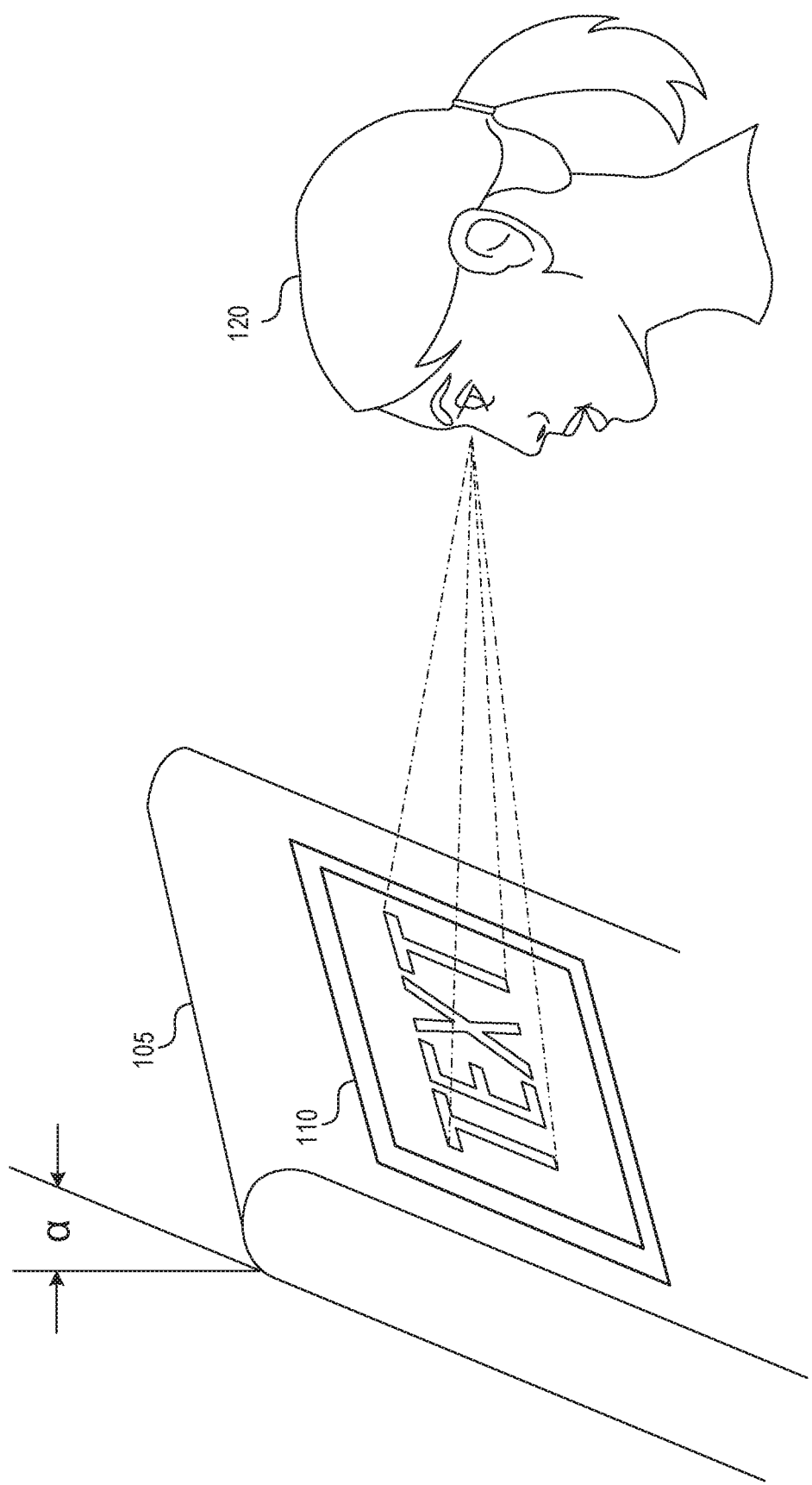
FIG. 1C illustrates a passenger viewing an IFE monitor when the IFE monitor of FIG. 1B is reclined.

FIG. 1C illustrates a passenger viewing an IFE monitor when the IFE monitor of FIG. 1B is reclined or tilted from its regular upright position. For example, FIG. 1C shows seat 105 reclined by an angle alpha ($\alpha$) with respect to an upright position of seat 105. Greater the angle alpha, greater would be the amount of distortion perceived by passenger 120.

FIG. 1D illustrates perceived distortions to content displayed on the IFE monitor of FIG. 1B when the IFE monitor is reclined. As a result of seat 105 getting reclined, IFE monitor 110 gets reclined or tilted, and hence passenger 120 perceives distorted content 117 instead of original content 115. Distorted content 117 can appear at a different eye level to passenger 120 in comparison to original content 115.

FIG. 2A is a conceptual diagram illustrating original content displayed on an IFE monitor. The original content or the actual content is the content that has not been subjected to perspective distortions.

FIG. 2B is a conceptual diagram illustrating content displayed on the IFE monitor of FIG. 2A as perceived by the human eye. For example, the content in FIG. 2B is distorted content observed by a passenger and is the outcome of perspective distortion of the original content in FIG. 2A.

FIG. 2C is a conceptual diagram illustrating a comparison of the content of FIG. 2A and FIG. 2B. For example, FIG. 2C shows the distorted content of FIG. 2B overlaid on the original content of FIG. 2A.

FIG. 2D is a conceptual diagram illustrating an outcome of performing perspective correction as perceived by the human eye. For example, FIG. 2D shows none or hardly any distortions of the displayed content, when perspective correction is applied to the distorted content of FIG. 2B. The corrected content in FIG. 2D appears "more squared" than the distorted content in FIG. 2B.

Figure 3A:
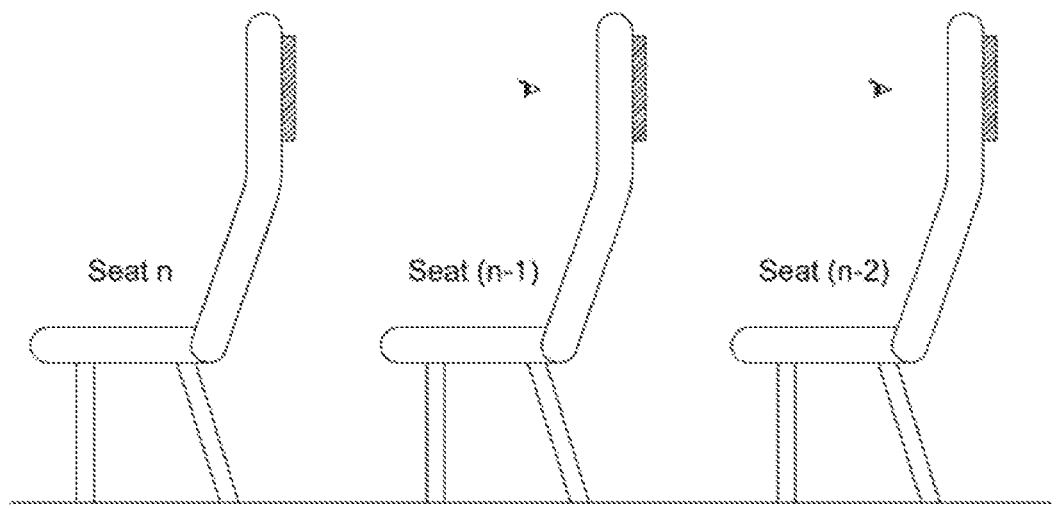
FIGS. 3A-3D show different configuration of seats in a passenger vehicle.

FIGS. 3A-3D show different configuration of seats in a passenger vehicle. For example, FIG. 3A shows successive seats numbered n, n-1, and n-2 placed in upright positions in a passenger vehicle. Seats n, n-1, and n-2 have IFE monitors at their respective backs. Passengers sitting on seats n-1 and n-2 can view content displayed on IFE monitors attached to the backs of seat n and seat n-1.

Figure 3B:
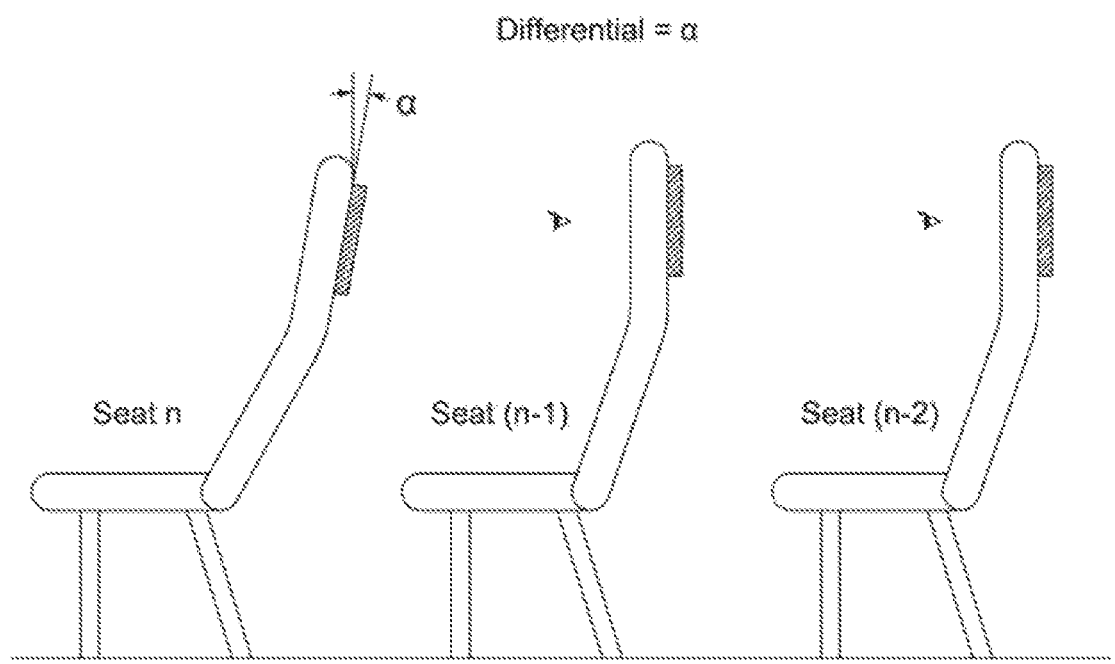

FIG. 3B shows a configuration of seats n, n-1 and n-2 in which seat n is reclined by an angle alpha ($\alpha$) with respect to an upright position. As a result, a passenger sitting on seat n-1 views a distorted version of the actual content displayed on IFE monitor attached to seat n. In some embodiments, an IFE monitor can have an integrated gyroscope sensor. The gyroscope sensor located in IFE monitor attached to seat n can measure the angle of recline (e.g., angle alpha) and communicate the measurement to the IFE monitor attached to seat n. A gyroscope included in the IFE monitor attached to seat n-1 can first measure an angle of recline of seat n-1. For the configuration shown in FIG. 3B, the gyroscope can measure the angle of recline as zero. After receiving the angle of recline of seat n-1 from the integrated gyroscope sensor, the IFE monitor attached to the back of seat n-1 can communicate measurement of the angle of recline of seat n-1 to seat n. Based on the measurements of the angles of recline for respective seats n and n-1, the IFE monitor can determine a net or resultant differential angle of tilt. For the configuration shown in FIG. 3B, the IFE monitor attached to the back of seat n computes the differential angle of tilt as alpha ($\alpha$). Using the differential angle of tilt (e.g., alpha), the IFE monitor can calculate a perspective correction for application on the distorted content displayed on the IFE monitor attached to the back of seat n.

Figure 3C:
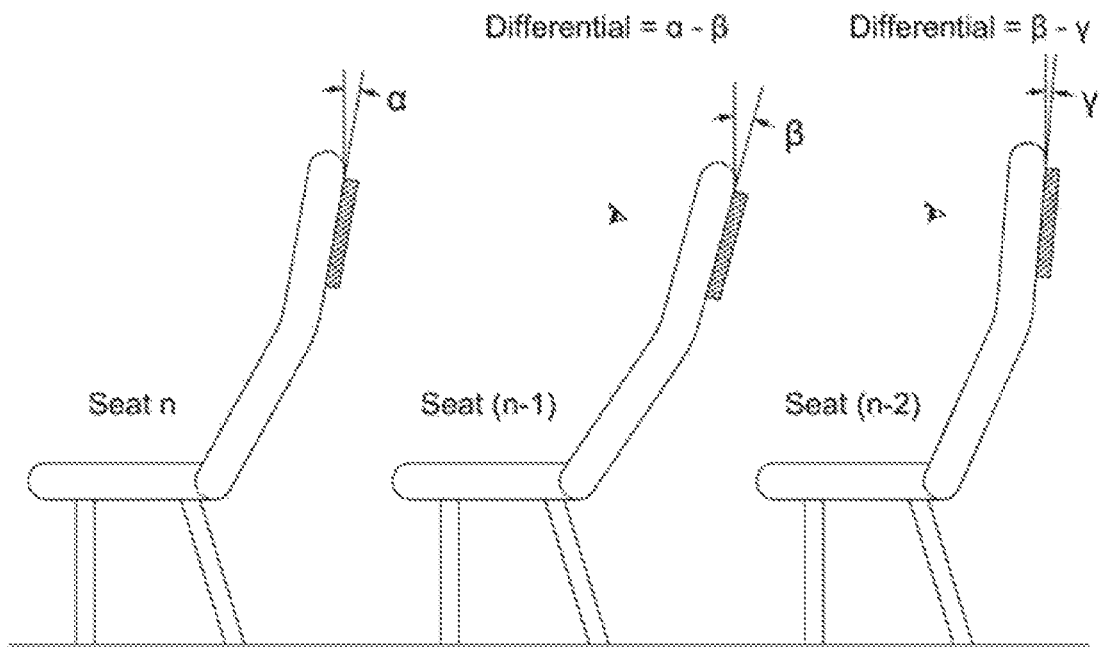

FIG. 3C shows a configuration of seats n, n-1 and n-2 in which seat n, n-1, and n-2 are reclined respective by angles alpha ($\alpha$), beta ($\beta$), and gamma ($\gamma$), with respect to the vertical upright positions of these seats. As a result of the reclining of seats n, n-1, and n-2, the content appearing on IFE monitors attached to seat n and seat n-1 are perceived as distorted content by passengers viewing IFE monitors attached to seat n and seat n-1. Gyroscopes included in IFE monitors attached to seat n and seat n-1 can compute their respective differential angles of tilt as alpha-beta ($\alpha$-$\beta$), and beta-gamma ($\beta$-$\gamma$). In accordance with disclosed embodiments, the IFE monitors attached to seat n and seat n-1 can apply perspective corrections based on alpha-beta and beta-gamma respectively. As a consequence of applying the perspective corrections, passengers sitting on seat n-1 and n-2 can view distortion-free or almost distortion-free content in IFE monitors attached to seat n and seat n-1.

Figure 3D:
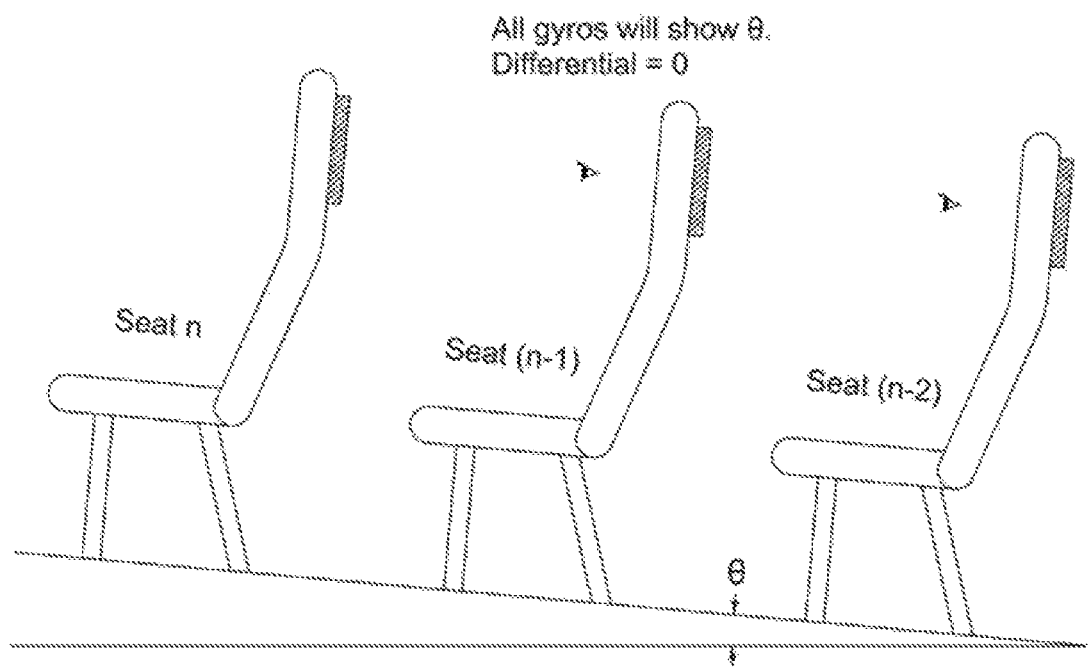

FIG. 3D shows a configuration of seats n, n-1 and n-2 during take-off. In this configuration, the angular measurement data of gyroscopes included in every IFE monitor is the same. For example, gyroscopes included in seats n, n-1, and n-2 each measure the angle of rotation of the airplane as angle theta ($\theta$). In some embodiments, advantageously, IFE monitors can communicate with one another. In some embodiments, this communication can include a use of a wired Ethernet connection (e.g., a communication bus running along the length of a commercial aircraft). In some embodiments, this communication can include use of a Wi-fi connection in which the IFE monitors can function as wireless stations communicating via an Access Point (AP) or in a peer-to-peer (P2P) mode in which IFE monitors are peer devices of the Wi-fi network. Still referring to FIG. 3D, upon measuring their respective angles of rotation, the IFE monitors communicate their measurements to IFE monitors in other seats. After receiving the angular measurement data (from an integrated gyroscope and from other IFE monitors), an IFE monitor can compute a differential angle of tilt associated with itself. Because passenger seats during take-off are placed in their upright positions, the differential angle of tilt computed by IFE monitors are the same (e.g. equal to zero). Thus, in FIG. 3D, the differential angles of tilt computed by IFE monitors attached to seat n and seat n-1 are both zero. Hence, for example, perspective correction may not be necessary during take-off. A similar scenario can occur during landing when passenger seats are placed in their upright positions. Thus, perspective correction may not be necessary during landing. One advantage of the disclosed technology is that by providing angular measurement data from multiple IFE monitors, the disclosed technology provides validation of angular measurement data from multiple IFE monitors, thereby reducing or eliminating false positives of detecting distortion-causing events. Hence, in instances where there is no distortion-causing event (e.g., a takeoff or landing), the disclosed technology does not erroneously apply perspective correction to content displayed on IFE monitors.

Although FIGS. 3B-3D illustrate seats reclined from their upright positions, such illustrations are merely for discussion purposes. In alternate embodiments, one or more seats in a commercial passenger vehicle can tilt forward or incline. In those embodiments, the differential angle of tilt can factor in a sign of the angle of incline as being in a direction opposite to the angle of recline. Further, although the IFE monitors in FIGS. 3A-3D are illustrated from seatbacks of passengers, IFE monitors can be located in other areas of the airplane not necessarily at the back of a passenger seat. For example, one or more IFE monitors can be located in the bulk head region of the airplane.

Figure 4:
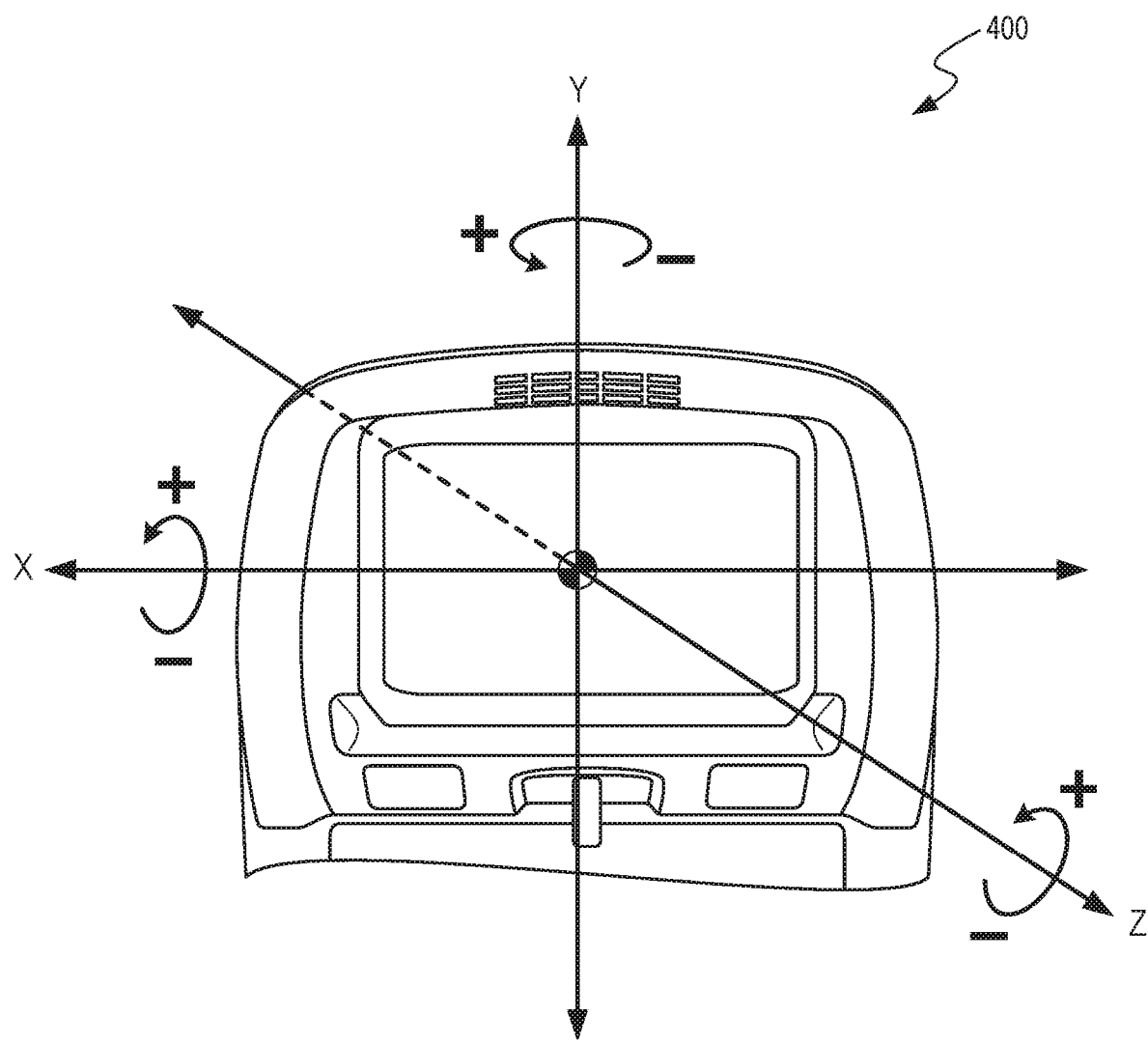
FIG. 4 illustrates an operation of a gyroscope sensor included in an IFE monitor.

FIG. 4 illustrates an operation of a gyroscope sensor included in an IFE monitor 400. For example, FIG. 4 shows angular measurement data around the X, Y, and Z axes from an integrated gyroscope included in an IFE monitor. An example of angular measurement data can be rate of rotatory motion (in radian/second). The angular measurement data can be used by an IFE monitor to detect distortion and compute a perspective correction that can be applied to content perceived as distorted to a human eye. In some embodiments, a gyroscope sensor can include or be connected to other sensors (e.g., an acceleration sensor). The angular measurement of the rate of rotatory motion and/or other measurements can be mathematically converted (e.g., by an IFE monitor) to an angle of incline of a passenger seat, an angle of recline of a passenger seat, an angle of inclination of an aircraft during takeoff, or an angle of inclination of an aircraft during landing. The integrated gyroscope sensor can communicate angular measurement data to the IFE monitor (or, a software application running on the IFE monitor) in which it is included. One advantage of using a gyroscope in detecting distortion-causing events is that a gyroscope can measure angular data under any type of cabin lighting conditions. That is, the gyroscope can measure angular data when the cabin of the airplane is brightly lit, minimally lit, or complete darkness.

Figure 5:
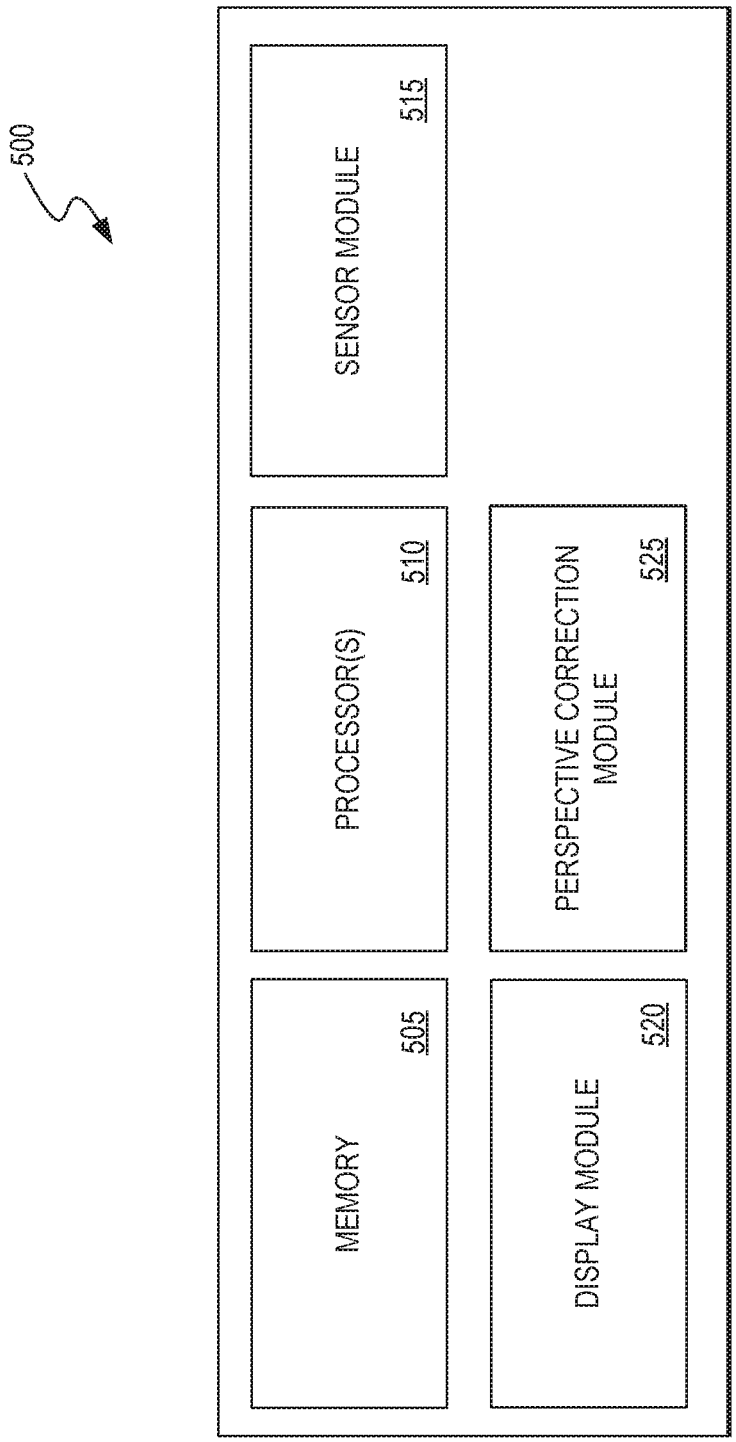
FIG. 5 illustrates a block diagram of components or modules included in an IFE monitor.

FIG. 5 illustrates a block diagram of components or modules included in an IFE monitor 500. For example, FIG. 5 shows that an IFE monitor includes at least one processor 510, at least one memory 505 storing instructions thereupon to perform the operations in the various embodiments described in this patent document, a sensor module 515 including one or more sensors, a display module 520, and a perspective correction module 525. The processor 510 executes the instructions stored in the memory 505. The sensor module 515 includes at least one transceiver that enables wired and/or wireless communications (send and/or receive) with other IFE monitors and/or a headend server computer located in the commercial passenger vehicle. (For example, individual measurements of angular data by electronic sensors included within the IFE monitors can be first communicated by the IFE monitors to a headend server computer which can then broadcast or communicate the measurements to the IFE monitors.) In some embodiments, sensor module 515 can include a gyroscope sensor, an accelerometer sensor, a GPS sensor for determining directionality, and/or a stabilization sensor to compensate for background vibration of the commercial passenger vehicle. Angular measurement data can be communicated by the gyroscope and accelerometer sensors to perspective correction module 525 directly (or, indirectly via processor 510). Using the angular measurement data from the integrated gyroscope and/or gyroscopes in other IFE monitors, perspective correction module 525 can calculate a differential angle of tilt associated with IFE monitor 500. In response to detecting a non-zero differential angle of tilt, perspective correction module 525 applies perspective correction to distorted content (e.g., images, video, or 3D content) displayed by display module 520. This causes display module 520 to display distortion-free or almost distortion-free content on the IFE monitor 500.

In some embodiments, sensor module 515 can include an eyeball tracking sensor for tracking an eye level of a passenger viewing IFE monitor 500. Eyelevel measurement data measured by the eyeball tracking sensor can be communicated to perspective correction module 525. In these embodiments, the differential angle of tilt can be based on eyelevel measurement data from integrated eyeball tracking sensors included within IFE monitor 500 and/or eyeball tracking sensors included in other IFE monitors that track eye levels of other passengers. In response to detecting that an eye level of a passenger fails to lie within a threshold range, perspective correction module 525 can identify a distortion-causing event, and accordingly apply a perspective correction to content displayed by display module 520 to fix the perceived distortion. The eyeball tracking sensors can be mounted external to IFE monitor 500 in a direction facing towards the passenger.

In alternate embodiments, sensor module 515 can include a thermal imaging camera or sensor to locate a face level of a passenger. Face level measurement data measured by the thermal imaging camera can be communicated to perspective correction module 525. In these embodiments, the differential angle of tilt can be based on face level measurement data from an integrated thermal imaging camera included within IFE monitor 500 and/or thermal imaging cameras included in other IFE monitors that track face levels of other passengers. In response to detecting that a face level of a passenger fails to lie within a threshold range, perspective correction module 525 can identify a distortion-causing event, and accordingly apply a perspective correction to content displayed by display module 520 to fix the perceived distortion. The thermal imaging cameras can be mounted external to IFE monitor 500 in a direction facing towards the passenger.

For applying a perspective correction to content that appears distorted, embodiments of the disclosed technology can use gyroscope sensors, eyeball tracking sensors, thermal imaging cameras, or any combination of the above. Thus, advantageously, the technology disclosed herein can adjust a perspective distortion arising from different eye levels and/or different seat incline/recline angles.

In some optional embodiments, perspective correction module 525 can be configured to receive manual adjustments from a passenger. In these embodiments, display module 520 can display on a graphical user interface (GUI) of IFE monitor 500 a plus/minus button for manually adjusting perspective distortion. A passenger viewing the GUI can click on the plus/minus button to increase or decrease a baseline perspective correction (computed by perspective correction module 525) to the content displayed on IFE monitor 500. The baseline perspective correction may be based on calculation of a differential angle of tilt obtained from angular measurement data from one or more gyroscopes, e.g., an integrated gyroscope included in IFE monitor 500 and/or other gyroscopes located in other IFE monitors in the commercial passenger vehicle.

Figure 6:
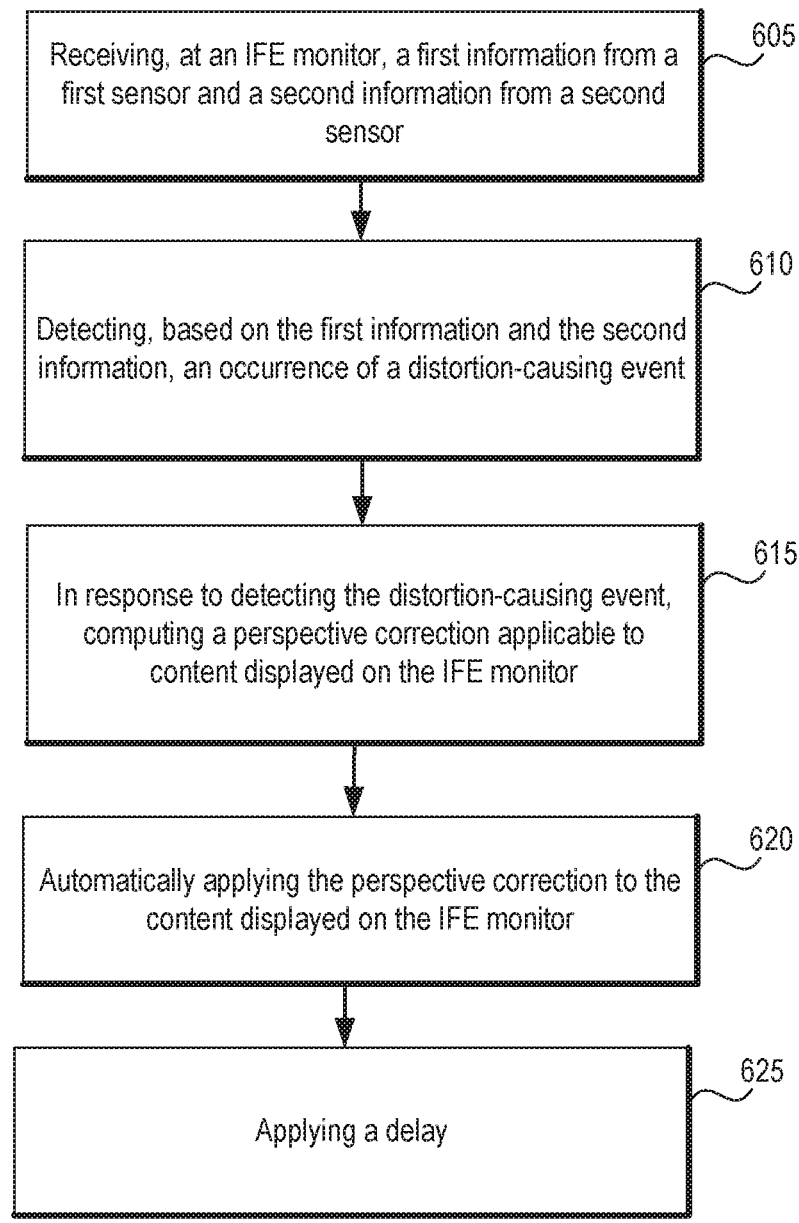
FIG. 6 is a flow diagram illustrating a process used in some implementations for applying a perspective correction to content displayed on an IFE monitor.

FIG. 6 is a flow diagram illustrating a process used in some implementations for applying a perspective correction to content displayed on an IFE monitor on the back of a first passenger seat. For example, the process shown in FIG. 6 can be implemented by a software application configured to run on an IFE monitor. At step 605, the IFE monitor receives first information (alternately first data) from a first sensor and second information (alternately second data) from a second sensor. For example, the first sensor can be a gyroscope integrated within the IFE monitor, a thermal imaging camera mounted on the IFE monitor, or an eyeball tracking sensor mounted on an IFE monitor. The first sensor can be located in the IFE monitor and the second sensor can be associated with another IFE monitor located at the back of a second passenger seat. If the first sensor and the second sensor are gyroscope sensors, then the first information and second information can correspond to angular information. For example, the first information can be angular information corresponding to an angle of incline/recline of the passenger seat attached to the IFE monitor and the second information can be an angle of incline/recline of another passenger seat located behind the passenger seat associated with the process. As another example, the first information and the second information can be an angle of inclination (with respect to a roll axis) of the commercial passenger vehicle measured by a first gyroscope sensor associated with a first passenger seat and a second gyroscope sensor associated with a second passenger seat. Based on the first angular information and the second angular information, the process computes a differential angle of tilt. That is, at step 610, the process detects a distortion-causing event based on the first information and the second information. If the differential angle of tilt is a non-zero value, then the process identifies a distortion-causing event as inclining or reclining of the passenger seat attached to the IFE monitor associated with the process, or another passenger seat located behind the passenger seat associated with the process. In response to detecting a distortion-causing event, the process computes a perspective correction to the content displayed on the IFE monitor. Accordingly, the process detects (step 615) that the content displayed on the IFE monitor is subject to distortion perceived by a passenger viewing the IFE monitor. At step 620, the process automatically applies the perspective correction to the content displayed on the IFE monitor to compensate for, or fix the distortion. For example, applying a perspective correction can include applying a perspective projection of the originally intended content to the tilted IFE monitor. Applying a perspective correction can also include applying an image scaling and/or transformation (or, generally perform image processing) of the content that appears distorted. Thus, applying perspective correction can result in background lines in the content remaining straight while the face of humans or other animate objects getting perspective-shifted (e.g., appear less "stretched out"). It will be appreciated that the effect of the applied perspective correction is to maintain or preserve an aspect ratio of the content displayed on the IFE monitor. The perspective correction applied to the content can be a horizontal perspective correction, a vertical perspective correction, or a combination of horizontal and vertical perspective corrections. In some embodiments, the perspective correction applied at step 620 is a real time (or, near real time) correction with respect to a time when the process identifies an occurrence of a distortion-causing event.

At step 625, the process applies a wait time or delay before receiving subsequent sets of angular measurement data (e.g., from the integrated gyroscope sensor and/or measurement data received from other IFE monitors). Applying a waiting time is advantageous: it reduces the "ping-pong effect" to the human eye of continually adapting to rapid changes in displayed content. The waiting time can be a configurable duration of time during which the process does not receive angular measurement data. In some embodiments, the disclosed technology can further reduce the "ping-pong effect" to the human eye by allowing a passenger viewing an IFE monitor to select how frequently he or she would like to view corrected content appearing on the IFE monitor.

Although the descriptions herein discuss applying a perspective correction to fix perspective distortions, such discussions are merely for illustration purposes. In alternate embodiments, other types of distortion correction techniques can be used.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" or "embodiments" (e.g. "some implementations," "various implementations," "one implementation," "an implementation," "some embodiments," "various embodiments," "one embodiment," "an embodiment," etc.) means that a particular feature, structure, or characteristic described in connection with the implementation or embodiment is included in at least one aspect of the disclosure. The appearances of these phrases in various places in the specification are not necessarily all referring to the same implementation or embodiment, nor are separate or alternative implementations or embodiments mutually exclusive of other implementations or embodiments. Moreover, various features are described which may be exhibited by some implementations or embodiments and not by others. Similarly, various requirements are described which may be requirements for some implementations or embodiments but not for other implementations or embodiments.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

We claim:

1. A method of fixing distortions to content displayed on in-flight entertainment (IFE) monitors in a commercial passenger vehicle comprising:

receiving, by a processor of an IFE monitor, a first angular information from a first gyroscope sensor and a second angular information from a second gyroscope sensor located within the commercial passenger vehicle;

detecting, by the processor of the IFE monitor, an occurrence of a distortion-causing event based on determining a differential angle of tilt between the first angular information and the second angular information;

in response to detecting the distortion-causing event, computing, by the processor of the IFE monitor, a perspective correction applicable to a content displayed on the IFE monitor; and automatically applying, by the processor of the IFE monitor, the perspective correction to the content displayed on the IFE monitor, wherein the perspective correction preserves an aspect ratio of the content displayed on the IFE monitor responsive to and based on the differential angle of tilt.

2. The method of claim 1, wherein the IFE monitor is a first IFE monitor, wherein the distortion-causing event corresponds to an incline or a recline of a passenger seat, and wherein the method further comprises receiving, from the first gyroscope sensor included in the first IFE monitor, the first angular information; and receiving, from the second gyroscope sensor included in a second IFE monitor that is different from the first IFE monitor, the second angular information.

3. The method of claim 1, further comprising:

upon applying the perspective correction to the content displayed on the IFE monitor, the IFE monitor waits for a time interval before receiving subsequent sensor information.

4. The method of claim 1, further comprising:

computing the differential angle of tilt, using the first angular information and the second angular information; and electronically computing the perspective correction based on the differential angle of tilt, wherein the electronically computing is without a use of a mechanical structure.

5. The method of claim 1, wherein the distortion-causing event corresponds to a recline of a passenger seat, wherein receiving the first angular information from the first sensor includes:

receiving, by the processor of the IFE monitor, an angle of the recline of the passenger seat with respect to an upright position of the passenger seat, wherein the angle of the recline is that of the passenger seat associated with the IFE monitor.

6. The method of claim 1, wherein the IFE monitor is a first IFE monitor, and wherein receiving the first angular information and the second angular information includes:

receiving, at the first IFE monitor, a first angle of recline of a passenger seat with respect to an upright position of the passenger seat, wherein the first angle of recline is that of the passenger seat associated with the first IFE monitor, and further wherein the first gyroscope sensor is included in the first IFE monitor; and receiving, from a second IFE monitor different from the first IFE monitor, a second angle of recline of another passenger seat with respect to an upright position of the another passenger seat, wherein the second gyroscope sensor is included in the second IFE monitor.

7. The method of claim 1, wherein the IFE monitor is a first IFE monitor, and wherein receiving the first angular information and the second angular information includes:

receiving, at the first IFE monitor, a first angle of a rotation of the commercial passenger vehicle with respect to a roll axis of the commercial passenger vehicle, wherein the first angle of rotation is measured by the first gyroscope sensor included in the first IFE monitor; and receiving, from a second IFE monitor different from the first IFE monitor, a second angle of a rotation of the commercial passenger vehicle with respect to a roll axis of the commercial passenger vehicle, wherein the second angle of rotation is measured by the second gyroscope sensor included in the second IFE monitor.

8. The method of claim 1, wherein the first angular information is further received from a thermal imaging camera, an eyeball tracking sensor, or a combination thereof.

9. The method of claim 1, wherein the perspective correction is one of a horizontal perspective correction, a vertical perspective correction, or a combination perspective.

10. A system for fixing perceived distortions to content displayed on in-flight entertainment (IFE) monitors in a commercial passenger vehicle comprising:

a first IFE monitor located in the commercial passenger vehicle, the first IFE monitor configured to:
receive a first angular measurement data from a first gyroscope sensor and a second angular measurement data from a second gyroscope sensor, wherein the first gyroscope sensor is included in the first IFE monitor and the second gyroscope sensor is associated with a second IFE monitor located in the commercial passenger vehicle;
compute, using the first angular measurement data and the second angular measurement data, a differential angle of tilt;
in response to determining that the differential angle of tilt is non-zero, detect that a content displayed on the first IFE monitor is subject to a perceived distortion; and
automatically apply a perspective correction to the content displayed on the first IFE monitor for fixing the perceived distortion, wherein the perspective correction is based on the differential angle of tilt and preserves an aspect ratio of the content displayed on the first IFE monitor; and the second IFE monitor located in the commercial passenger vehicle, the second IFE monitor configured to:
receive the second angular measurement data measured by the second gyroscope sensor; and
communicate the second angular measurement data to the first IFE monitor.

11. The system of claim 10, wherein the first IFE monitor is further configured to:
upon applying the perspective correction to the content displayed on the first IFE monitor, wait for a time interval before receiving subsequent angular measurement data.

12. The system of claim 10, wherein the first IFE monitor is further configured to:
electronically compute the perspective correction based on the differential angle of tilt associated with the first IFE monitor, wherein the electronically computing is without a use of a mechanical structure.

13. The system of claim 10, wherein the first IFE monitor is located at a bulk head region of the commercial passenger vehicle and the second IFE monitor is located at a back of a passenger seat.

14. The system of claim 10, wherein the first IFE monitor is located at a back of a first passenger seat and the second IFE monitor is located at a back of a second passenger seat.

15. The system of claim 10, wherein the second IFE monitor is located behind the first IFE monitor with respect to a front of the commercial passenger vehicle.

16. The system of claim 15, wherein the second IFE monitor is located immediately behind the first IFE monitor.

17. A non-transitory, computer-readable storage medium storing instructions that, when executed by a computing system associated with an in-flight entertainment (IFE) monitor, cause the IFE monitor to perform operations for automatic corrections of distortions to content displayed on the IFE monitor, the operations at the IFE monitor comprising:

receiving a first angular measurement data from a first gyroscope sensor and a second angular measurement data from a second gyroscope sensor that is associated with a second IFE monitor;
computing, using the first angular measurement data and the second angular measurement data, a differential angle of tilt between the IFE monitor and the second IFE monitor;
in response to determining that the differential angle of tilt is non-zero, detecting that a content displayed on the IFE monitor is subject to a perceived distortion; and
automatically applying a perspective correction to the content displayed on the IFE monitor for fixing the perceived distortion, wherein the perspective correction is based on the differential angle of tilt and preserves an aspect ratio of the content displayed on the IFE monitor, wherein a computation of the perspective correction is without a use of a mechanical structure.

18. The computer-readable storage medium of claim 17, wherein the IFE monitor is a first IFE monitor, and wherein receiving the angular measurement data at the first IFE monitor includes further operations comprising:
receiving, from the first gyroscope sensor included in the first IFE monitor, the first angular measurement data; and
receiving, from the second gyroscope sensor included in the second IFE monitor that is different from the first IFE monitor, the second angular measurement data.

\* \* \* \* \*